United States Patent [19]

Åström

[11] Patent Number: 4,546,709
[45] Date of Patent: Oct. 15, 1985

[54] APPARATUS FOR THE COMBUSTION OF CARBONACEOUS MATERIAL

[75] Inventor: Ingemar Åström, Stenungsund, Sweden

[73] Assignee: Gotaverken Energy Systems AB, Göthenburg, Sweden

[21] Appl. No.: 629,460

[22] Filed: Jul. 10, 1984

[30] Foreign Application Priority Data

Jul. 15, 1983 [SE] Sweden .................... 8303992

[51] Int. Cl.⁴ .............................. F23J 3/00
[52] U.S. Cl. .................... 110/216; 110/266; 110/263; 122/4 D; 60/39.464
[58] Field of Search ......... 110/263, 265, 266, 216, 110/245; 122/4 D; 60/39.464

[56] References Cited

U.S. PATENT DOCUMENTS

| | | | |
|---|---|---|---|
| 2,718,754 | 9/1955 | Lewis et al. | 60/39.02 |
| 3,716,003 | 2/1973 | Battcock | 122/4 D |
| 3,763,830 | 10/1973 | Robinson et al. | |
| 4,021,184 | 5/1977 | Priestley | |

FOREIGN PATENT DOCUMENTS 1542862  2/1975  United Kingdom .

Primary Examiner—Carroll B. Dority, Jr.
Attorney, Agent, or Firm—Holman & Stern

[57] ABSTRACT

A reaction chamber with a fluidized bed encloses two superposed cyclone separators connected in series. In order to prevent combustion gases from entering the lowermost separator by way of its particulate matter outlet, this is formed as a downwardly extended pipe, which is enclosed by a sleeve through which secondary air passes. The sleeve projects somewhat below the mouth of the pipe, and the issuing air causes an ejector action, which prevents gas from entering the pipe. The particulate matter return flow pipe from the upper cyclone is also extended downwards and terminates within the ejector.

9 Claims, 5 Drawing Figures

APPARATUS FOR THE COMBUSTION OF CARBONACEOUS MATERIAL

BACKGROUND OF THE INVENTION

1. Field of the Invention

The present invention relates to an apparatus for the combustion of carbonaceous material in a vertical reaction chamber having a fluidized bed and at least one cyclone separator for collecting and returning solid matter entrained in the combustion gases to the bed, and to expell cleaned gas.

2. Description of the Prior Art

It is presupposed that a fluidized bed operating with circulating matter is a known technique. The expression carbonaceous material is intended to cover arbitrary kinds of fuel. The bed is also supplied with non-combustible matter, for instance limestone, and inert material so that a desired volume of the bed is maintained.

In known plants the separation of solid matter usually occurs outside the reaction chamber. The location of cyclone separators within the chamber will provide a more compact design. In order that the separated matter really flows out of the cyclone it is essential to prevent an upward flow of gas through the passage transferring the solid matter.

SUMMARY OF THE INVENTION

Such upward flow of gas can be prevented by the supply of part of the combustion gas in a downwardly directed ejector, enclosing the mouth of the return flow passage. By selecting the impulse action of the ejector rather high, it will be possible to eject also an amount of gas from the cyclone, which improves the return of small-size particles directly to the bed over that possible in conventional cyclones.

A reaction chamber enclosing the fluidized bed and the cyclone may be fully or partly uncooled, and the issuing gases may be used in some process plant. The reaction chamber may however also form part of the furnace of a steam or hot water boiler. The cyclone may be cooled or uncooled, and the chamber may be enclosed in a casing which makes it possible to operate the combustion at a super atmospheric pressure, the energy content of the exhaust gases being reclaimed in a turbine.

In order to attain a high degree of separation, which is desirable if the gases are to pass through a turbine, two cyclones could advantageously be fitted in series within the unit.

In operation a certain amount of solid matter is kept circulating, and it may become desirable to change the amount of material in the bed, depending, for instance, upon changes in load upon the plant and/or the quality of the fuel occasionally supplied.

There should be a storage vessel for the circulating material, and there must be a possibility to remove ashes and spent bed material.

With furnaces operated at super-atmospheric pressure, for instance 7–8 bar, and where the exhaust gases are led to a turbine driving a compressor delivering air for the combustion and the fluidization, it is practically impossible to arrange a visual inspection of the conditions in the bed.

The storing of circulating matter and the removal of ashes can be governed by a microcomputer, which by way of suitably located sensors obtains information relating to tendencies toward deviations from predetermined values of the stored material, and can initiate corrective action.

A reaction chamber according to the invention is characterized in that the cyclone separator is provided with an elongate return flow pipe, which is enclosed by a sleeve extending about to the mouth of the return flow pipe, and being at its upper end connected to a conduit supplying part of the combustion air.

In order to obtain a high degree of separation two cyclones can advantageously be mounted in series within an enclosing casing, each provided with a number of tangentially directed gas inlets. The downstream cyclone is mounted coaxially above the upstream cyclone and the longitudinal axis of the downstream cyclone coincides with that of the casing. The cyclone is provided with an elongate return flow pipe, which passes through the return flow pipe of the first cyclone and extends about to the mouth thereof.

Preferably the casing, above the first cyclone, encloses a distribution chamber for the air supplied to the sleeve of the first cyclone. The gas outlet from the latter passes upwardly through the air chamber, the return flow pipe of the downstream cyclone passing centrally through the gas outlet.

The sleeve of the first cyclone is preferably suspended from an upper portion of the enclosing casing. The first cyclone preferably hangs in an outer shell plate by way of tangentially directed gas passage structures, the upwardly directed gas outlet pipe being supported by the cyclone.

The gas outlet pipe from the first cyclone is, when it has passed the air distribution chamber, connected to a wall extending outwardly to the casing, whereby the second cyclone will be enclosed in a second gas chamber.

The second cyclone is preferably supported from the casing by way of an upwardly directed portion of its gas outlet pipe.

The casing is preferably dimensioned to permit the combustion process to be operated at a super-atmospheric pressure, the outlet from the second cyclone being connected to a turbine driving a compressor delivering air to the bed as well as to the ejector.

A device for storing and control of the material building up the fluidized bed will according to the invention include a storage vessel, which by way of an open conduit communicates with the bed above a gas distribution plate, downwardly defining the bed, and is optionally connectable to a point above the level of the bed by a supply conduit. A pressure equalizing conduit connects the vessel with a conduit supplying fluidizing gas below the gas distribution plate.

The storage vessel is further preferably connected to a conduit supplying pressurized gas. This conduit is preferably split into two branches, one of which is connected to the bottom of the vessel, and the other of which is connected above the expected upper level of the material in the vessel.

The storage vessel is preferably suspended below the casing by means including load indicating devices.

The gas distribution plate carrying the bed lacks gas passage openings in a central portion, where the open withdrawal conduit passes.

The withdrawal conduit is preferably provided with a resilient device between the chamber and the vessel.

One inlet to the pressure equalizing conduit is preferably, within the vessel, provided with a device for separating out solid matter. The other end of the equalizing conduit terminates in an ejector device in the fluidizing gas supply conduit.

A microcomputer is preferably provided for sensing the conditions in the storage vessel and governing the conduits connected thereto.

BRIEF DESCRIPTION OF THE DRAWINGS

The invention will now be described in greater detail with reference to the accompanying drawings wherein.

DETAILED DESCRIPTION

Figure 1:
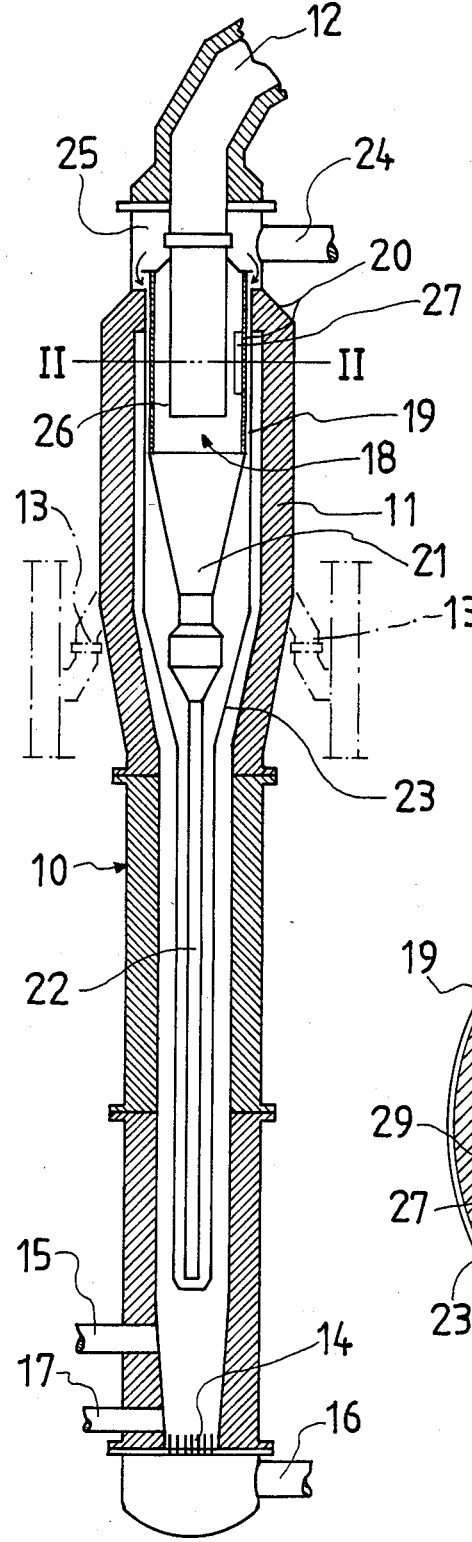
FIG. 1 is a vertical cross-sectional view through an un-cooled reactor chamber enclosing one cyclone separator.

The combustion plant shown in FIG. 1 includes an elongate un-cooled reactor chamber 10 having walls 11 of refractory material, outwardly covered by a steel casing. The plant is intended to supply hot gases to a consumer (not shown) by way of an exhaust conduit 12.

The reactor chamber is supported by brackets 13 at its upper portions, which ensures freedom of thermal movements, upwardly as well and downwardly.

In the lower portion of the chamber 10 there is a perforated plate 14, or gate. Fractionated solid fuel, inert material and for instance crushed limestone are supplied to the bed by way of a conduit 15, and primary combustion air, which also serves for fluidizing the bed is supplied by way of a conduit 16, enclosing the chamber below the plate 14. Ashes and used bed material are withdrawn by way of a further conduit 17.

The aim is to operate the plant with a so called fluidized bed, i.e. the supply of air through the bottom plate 14 is so intense that a portion of the combustible matter and other material in the bed is entrained in the issuing gases, and are later separated out and returned to the bed.

The separation of the particles occurs in a cyclone separator 18 of arbitrary known type, which here, in order to obtain compactness of the plant, is located within the reactor chamber.

The cyclone separator, which below for simplicity's sake will be referred to as the cyclone, includes an upper cylindrical portion 19, having tangentially directed gas inlet gates 20, and a funnel-shaped lower portion 21, which merges into an elongate particle return flow pipe 22. This reaches downwardly to terminate at its mouth a short distance above the bottom plate 14. Thus solid matter drops downwardly through pipe 22 and out the mouth thereof to bottom plate 14.

In order to prevent gases from the bed from entering the return flow pipe 22, thereby disturbing the function of the cyclone, the latter is enclosed by a sleeve 23, which extends downwardly, about to the mouth of the return flow pipe 22, and is designed with a restriction, so that an ejector action is obtained at its exit.

Secondary combustion air is supplied by way of a conduit 24 to a chamber 25, which encloses a pipe 26, through which the cleaned gases pass out from the cyclone. A narrow passage will remain between the upper portion of the casing 23 and the cylindrical portion 20 of the cyclone.

Secondary air will thus flow between the cyclone and the casing 23, downwardly thus cooling the latter while simultaneously being heated, and passes out of the casing 23 into the furnace around the mouth of the return flow pipe 22. The ejector action produced by the restriction at the lower end of the casing prevents gases from entering pipe 22 and aids the flow of solid matter through the mouth of pipe 22 thereby promoting the activity of the cyclone, especially regarding the separation of fine particles.

Figure 2:
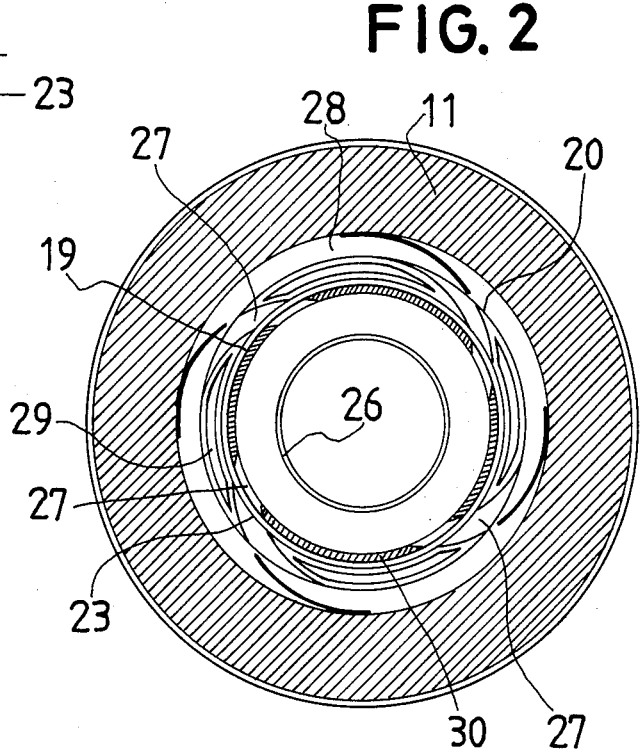
FIG. 2 is, on a larger scale, a horizontal cross-sectional view taken along line II—II in FIG. 1.

The sleeve 23 is suspended from the upper end if the casing 11, and the cyclone 18 is carried by the sleeve 23 by way of welded gas passages, which form the gates 27, connecting the sleeve 23 with the cyclone 18, as shown in FIG. 2.

The enlarged scale in FIG. 2 permits the introduction of reference 28 for the annular passage between the wall 11 of the reactor and the sleeve 23, as well as reference 29 for the secondary air passage between the sleeve 23 and the cylindrical portion 19 of the cyclone, which is subdivided by the gas passage gates 27. The upward face of the cylindrical portion of the cyclone is covered by a protective cladding 30.

The mounting of the cyclone permits thermal movements upwardly as well as downwardly from the level of suspension.

Figure 3:
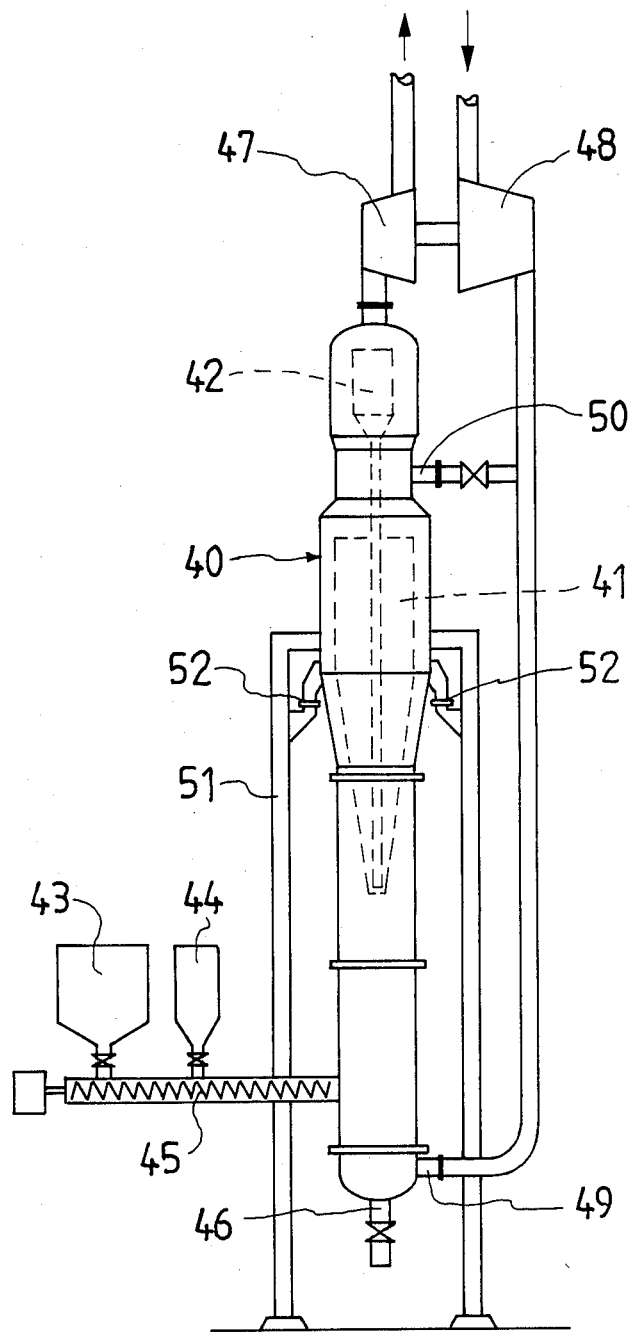
FIG. 3 is a schematic elevational view of a cooled reactor chamber with two cyclone separators and adapted to be operated at super-atmospheric pressure.

FIG. 3 shows a further embodiment of the invention, as used with a water-cooled reaction chamber 40 enclosing two cyclones 41 and 42 connected in series, and intended to be operated at super-atmospheric pressure. The design of the reaction chamber will be evident from the description pertaining to FIG. 4.

Fuel as well as inert and active bed material is fed from hoppers 43, 44 by means of a screw conveyor 45 to the furnace, and ashes and used bed material is removed by way of a conduit 46.

The combustion occurs at super-atmospheric pressure in the furnace, and the issuing gases are led to a turbine 47, which drives compressor 48. This will deliver air to the primary air/fluidizing gas inlet 49, as well as to a secondary air inlet 50.

The reactor chamber is suspended in a girder framework 51 by means of supports 52, as in the previous embodiment.

The auxiliary equipment at the reactor chamber is schematically indicated, and intended to illustrate only the operational principle. The water-cooled casing forms part of a steam or hot water boiler, and further heat absorbing surfaces are mounted downstream of the turbine 47. The turbine and the compressor may, in a well known manner, be doubled with further units mounted in series if a higher operating pressure is desired.

Figure 4:
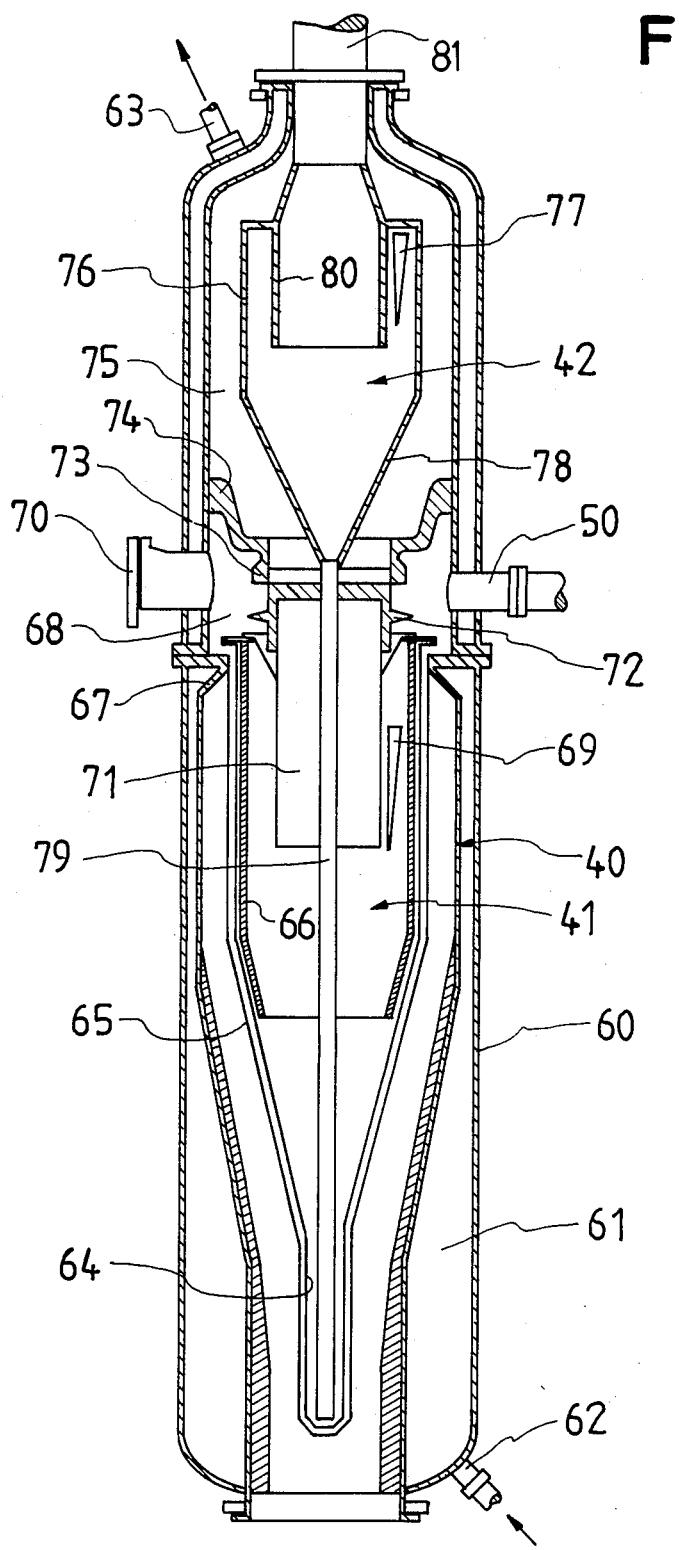
FIG. 4 is, on a larger scale, a vertical cross-sectional view through the reaction chamber and the cooled casing of the embodiment according to FIG. 3.

The design of the reactor chamber 40 is evident from FIG. 4. The reactor chamber is formed as a pressure vessel, which is enclosed in a double shell casing 60 which forms a chamber 61, through which water is circulated from an inlet 62 to an outlet 63, and which form part of the steam or hot water boiler, previously mentioned.

Within the reaction chamber there are, as mentioned in connection with FIG. 3, two superposed cyclones 41, 42 operating in series. A careful separation of particles is necessary as the gases are intended to pass through one or more turbines.

The first, lower cyclone 41 has a downwardly extended return flow pipe 64, which extends towards the bottom of the chamber. This cyclone is enclosed in a sleeve 65, which reaches down below the mouth of the return flow pipe 64. The upper portion of the cyclone is internally provided with a protective wall cladding 66.

The sleeve 65 is suspended from a collar 67 at the wall of the reactor which defines a chamber 68, to which secondary air is supplied by way of conduit 50. The secondary air can flow downwards in the annular passage remaining between the sleeve 65 and the wall of the cyclone. In the latter a number of gas inlet gates 69 are provided, and the cyclone is, in the same manner as described in connection with FIG. 1, supported from the sleeve 65 by means of the welded gas passages forming the gates.

An inspection and cleaning door to chamber 68 is denoted by 70.

The gas outlet pipe 71 from the first cyclone passes centrally through chamber 68, and is, by way of a bellows device 72 and conical connecting rings 73 connected to a structure 74 forming the upper wall defining chamber 68, and separating the latter from the chamber 75 enclosing the second cyclone 42.

The second cyclone 42 comprises an upper cylindrical portion 76, in which gas inlet gates 77 are provided, and a funnel-shaped lower portion 78. This merges into an elongate return flow pipe 79, which extends downwards to, and preferably somewhat beyond the mouth of the particle return flow pipe 64 from the first cyclone 41, but not beyond the mouth of sleeve 65. Thus, similarly to the embodiment of FIGS. 1 and 2, solid matter from lower cyclone 41 and upper cyclone 42 drops downwardly through pipes 64 and 79, respectively, and through the mouths at the lower ends thereof. The lower end of sleeve 65 has a restriction which produces an ejector action by air blown through sleeve 65 with respect to return flow pipe 79.

The gas outlet pipes 64 and 80 from the second cyclone 42 is extended upwardly and passes gas-tightly through an opening in the casing 60. It will carry the cyclone 42, which thus has full freedom of thermal movements downwardly. The continuing exhaust conduit 81 is, as previously mentioned, connected to a turbine.

Figure 5:
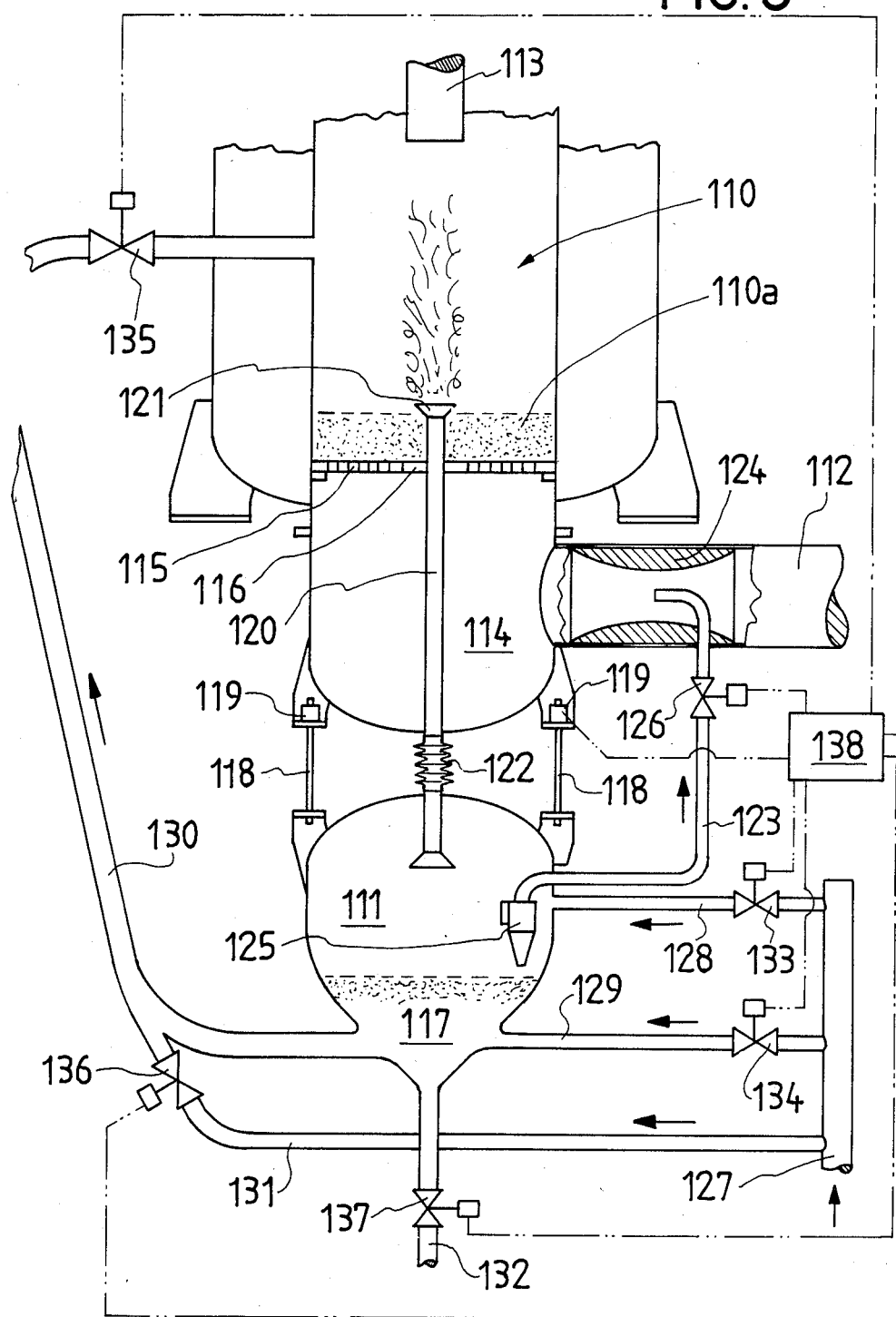
FIG. 5 is a schematic view of the lower portion of a furnace adapted to burn fuel in a fluidized bed at a pressure of 7 to 8 bar.

When the furnace is operated at a super-atmospheric pressure, say 7 to 8 bars, it will be difficult to control the condition of the bed visually, and the simple withdrawal conduit with a valve 46 is preferably substituted by a storage vessel with pertaining equipment, as shown in FIG. 5.

FIG. 5 shows the lower end of a reaction chamber 110 adapted for burning fuel in a fluidized bed and an attached storage vessel 111 for bed material. The conduit for feeding fuel and bed material, for instance limestone, into the chamber is not shown in this figure.

Fluidizing gas which may be, or to a major part consists of the primary combustion air, is supplied from a source, not shown, through a conduit 112 at a pressure which is sufficient to maintain the desired fluidizing and combustion condition in the bed, which here means that a considerable amount of particles will be carried away by the issuing gases, to be later separated therefrom and largely returned to the bed.

The devices for separating the particles may be located within, or outside, the reaction chamber, and are not shown in this figure, but a return flow pipe 113 from these devices is indicated centrally in the reaction chamber.

The fluidizing gas conduit 112 is connected to a gas distribution chamber 114, which is upwardly defined by a perforated plate 115. This lack gas passage openings within a central portion 116. In operation a certain amount of bed material will be maintained in "fluidized" condition above this plate.

The storage vessel 111 encloses a certain amount of bed material 117, and is suspended by straps 118 from the chamber 114. The straps include load sensing devices 119.

An open withdrawal conduit 120 passes through the unperforated central portion 116 of the bottom plate 115 and extends a distance above the latter, to be terminated by a funnel-shaped upper end 121. The withdrawal conduit 120 reaches down into the storage vessel 111, and is, intermediate the latter and the gas distribution chamber 114, provided with an expansion bellows 122.

A conduit 123 extends from the storage vessel 111 to the fluidizing gas supply conduit 112, and terminates in a restricted nozzle portion 124. The conduit 123 starts from a point in the storage vessel expected to remain above the highest level of material therein, and is provided with a device 125 for separating out solid material. An automatically governed valve 126 is provided in conduit 123.

A further conduit 127 supplies compressed air, or other gas to the particle transport system, and is with one branch 128 connected to the vessel 111 above the expected highest level of material therein, while another branch 129 is connected to the vessel below said level.

A transfer conduit 130 is connected to the vessel 111 below the material's level therein, and is connected to the reaction vessel 110 some distance above the bottom plate 115.

A fluid branch 131 from the compressed air supply conduit 127 is connected to the transfer conduit 130, between the vessel 111 and the reaction chamber, so as to facilitate transportation of material through conduit 130.

A further conduit 132 is connected to the bottom of the vessel 111 for the removal of material therefrom.

Automatically governed valves are provided in the various conduits, viz. No. 133 in conduit 128, No. 134 in conduit 129, No. 135 in conduit 130, No. 136 in conduit 131 and No. 137 in conduit 132.

A microcomputer 138 receives signals from the load sensing devices 119 indicating changes in the weight of the material stored in the vessel, and governs the various valves so the desired operating conditions are maintained. The microcomputer can be reset for adjustment with respect to varying output of the plant and/or the quality of the fuel occasionally used.

Due to the un-perforated portion 116 in the bottom plate 115, the border zones of the material howering adjacent to the bed 110a tends to collapse in the central part thereof, which causes a downwardly flow of gas and particles in the center of the bed, and a transfer to the storage vessel.

The load sensing device 119 are initially adjusted for an empty vessel and a hot reaction chamber, and will, in operating, provide satisfactorily accurate information about the amount of material in the vessel, and about changes in this content.

During normal operation all valves 126 and 133-137 are closed, and the pressure in the reaction chamber 110 and in the storage vessel 111 will be the same. Particles can reach the vessel only by gravity through the open withdrawal conduit 120.

If this will not ensure a satisfactory removal of particles, valve 126 is opened, whereby the pressure within the vessel 111 is reduced. This will increase the flow of particles to the vessel.

If instead it is desirable to restrict the flow of particles to the vessel, valve 133 will be opened so that a relatively higher pressure will prevail in the vessel.

If the amount of material in the reaction chamber is to be increased, the valves 134, 135 and also 136 will be opened, whereby material will be transferred to the reaction chamber by way of conduit 130.

During normal operation valve 134 is opened intermittently to "shock-lift" the material in the vessel 114, so as to prevent the material being clogged up.

The removal of material from the vessel occurs intermittently or continuously by way of conduit 132.

The embodiments described above and shown in the drawings are examples of the invention only, and the details thereof may be varied in many ways within the scope of the accompanying claims, depending upon the kind of fuel used and upon the expected output of the plant. The reaction chamber of the latest embodiment can be cooled only in part, and the casing may be built up of water-cooled membrane walls.

I claim:

1. An apparatus for the combustion of carbonaceous material in a vertical reaction chamber having air supply means for maintaining a fluidized bed in its lower part and to maintain combustion, comprising;
    a cyclone separator above said bed to receive combustion gases therefrom and to remove solid matter from the gases;
    an elongated flow pipe connected to said cyclone separator and extending towards the fluidized bed for returning solid matter to said bed; and
    a sleeve enclosing said cyclone separator and extending downwardly about said pipe to approximately the mouth of the pipe and terminating in an ejector means, said sleeve being connected to said air supply means for conducting part of the combustion air from a source thereof.

2. An apparatus according to claim 1 comprising first and second superposed cyclone separators operating in series within a casing and each having a plurality of tangential gas inlets, said second cyclone separator being located downstream of and aligned with said first cyclone separator, said second cyclone separator having an elongate return flow pipe passing through the return flow pipe of said first cyclone separator, and extending approximately to the mouth of said return flow pipe of said first separator.

3. The apparatus according to claim 2 wherein, said casing above said first cyclone separator encloses a distribution chamber for the combustion air supplied to the sleeve of said first cyclone separator, an outlet conduit for cleaned gas from said first cyclone separator passes centrally through said chamber, and the return flow pipe from said second cyclone separator passes centrally through said outlet conduit.

4. An apparatus according to claim 2 wherein, an upper portion of the sleeve of said first cyclone separator is suspended from said casing.

5. An apparatus according to claim 2 wherein, said first cyclone separator is suspended from said casing by its sleeve, said outlet conduit being carried by said cyclone separator.

6. An apparatus according to claim 3 and further comprising a partition wall connected to said outlet conduit and separating an upper gas chamber enclosing said second cyclone separator from said air distribution chamber.

7. An apparatus according to claim 2 wherein, said second cyclone separator is suspended from said casing by an upwardly directed extension of its gas outlet.

8. An apparatus according to claim 2 wherein, said casing is dimensioned to allow the combustion process to be operated at super-atmospheric pressure, and the gas outlet from said second cyclone separator is connected to at least one gas turbine operatively connected to and driving at least one compressor forming part of said air supply means.

9. An apparatus according to claim 2 wherein, said casing is formed as a double shell vessel so that a heat absorbing fluid can flow between the shells of said vessel.

* * * * *